(12) United States Patent
Jesu Plu et al.

(10) Patent No.: US 10,183,367 B2
(45) Date of Patent: Jan. 22, 2019

(54) TOOL-SUPPORT SYSTEM

(71) Applicant: AIRBUS OPERATIONS (S.A.S.), Toulouse (FR)

(72) Inventors: Marion Jesu Plu, Saint Nazaire (FR); Marc Lelay, Montoir de Bretagne (FR); Perig Le Henaff, Pontchateau (FR); Giovanni Loiacono, Saint Nazaire (FR); Fabio Vaselli, Milan (IT)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/217,438

(22) Filed: Jul. 22, 2016

(65) Prior Publication Data
US 2017/0028520 A1 Feb. 2, 2017

(30) Foreign Application Priority Data

Jul. 29, 2015 (FR) .................................... 15 57253

(51) Int. Cl.
*B23P 19/06* (2006.01)
*B23Q 9/00* (2006.01)
(Continued)

(52) U.S. Cl.
CPC ............ *B23P 19/06* (2013.01); *B23Q 9/0007* (2013.01); *B23Q 9/0042* (2013.01);
(Continued)

(58) Field of Classification Search
CPC .... B23P 19/06; B23P 2700/01; B23Q 9/0042; B23Q 9/0007; B23Q 17/2471;
(Continued)

(56) References Cited

U.S. PATENT DOCUMENTS 2,807,123 A * 9/1957 Palmer .................... B24B 7/224
451/153
3,634,975 A * 1/1972 Hensley ............... B23D 45/027
144/363
(Continued)

FOREIGN PATENT DOCUMENTS

EP 2 093 641 8/2009
EP 2093641 A1 * 8/2009 ........... G05B 19/401
(Continued)

OTHER PUBLICATIONS

French Search Report for Application No. 1557253 dated Jun. 14, 2016.

*Primary Examiner* — Kenneth M Lo
*Assistant Examiner* — Mohammed Shafayet
(74) *Attorney, Agent, or Firm* — Jenkins, Wilson, Taylor & Hunt, P.A.

(57) ABSTRACT

A tool-support system for working on holes of a surface. The tool-support system includes two rails fixed to the surface and having imprints regularly distributed over their length, and a mobile tool-support including a mobile optical system capturing an image of the surface. For each rail, at least one wheel is adapted to be moved on the rail, and includes on its rolling strip counter-imprints complementary to the imprints. A mobile tool carries a working tip, and a control unit is configured to control the movement of the mobile tool-support, of the tool and of the optical system to analyze an image captured by the optical system and to detect the presence of a hole. A tool-support system of this kind can therefore move along the rails without slipping while detecting the holes to work on them.

6 Claims, 2 Drawing Sheets

(51) Int. Cl.
  *G05B 19/402* (2006.01)
  *B23Q 17/24* (2006.01)
  *B64F 5/10* (2017.01)

(52) U.S. Cl.
  CPC ............ *B23Q 17/2471* (2013.01); *B64F 5/10* (2017.01); *G05B 19/402* (2013.01); *B23P 2700/01* (2013.01); *G05B 2219/45091* (2013.01); *G05B 2219/49113* (2013.01); *Y02P 70/585* (2015.11)

(58) Field of Classification Search
  CPC ... F02C 9/54; F02C 9/28; F02D 41/30; Y02T 10/42; F05D 2270/04; F05D 2270/303; G05B 19/402; G05B 2219/49113; G05B 2219/45091; B64F 5/10; Y02P 70/585
  USPC ........................................................ 700/192
  See application file for complete search history.

(56) References Cited

U.S. PATENT DOCUMENTS

| | | | | |
|---|---|---|---|---|
| 4,428,159 | A * | 1/1984 | Sigetich | B28D 1/047 125/13.03 |
| 4,446,845 | A * | 5/1984 | Harding | B23D 47/12 125/13.03 |
| 4,761,101 | A * | 8/1988 | Zettl | B23B 31/00 340/680 |
| 4,876,796 | A * | 10/1989 | Calkins | B27B 17/08 30/283 |
| 4,993,913 | A * | 2/1991 | Ohtsuki | B25J 5/00 180/901 |
| 5,303,477 | A * | 4/1994 | Kuzarov | F16D 1/0817 30/381 |
| 5,345,846 | A * | 9/1994 | Somma | B23B 29/043 407/108 |
| 5,836,068 | A * | 11/1998 | Bullen | B23Q 11/06 29/33 K |
| 6,129,031 | A * | 10/2000 | Sarh | D05B 25/00 112/470.13 |
| 6,152,127 | A * | 11/2000 | Fuhrman | B23D 47/025 125/13.01 |
| 6,317,989 | B1 * | 11/2001 | Forsberg | B27B 17/08 30/384 |
| 6,380,512 | B1 * | 4/2002 | Emer | B23K 26/04 219/121.71 |
| 6,445,971 | B1 * | 9/2002 | Gottschalk | B23Q 1/66 483/1 |
| 6,679,244 | B1 * | 1/2004 | Tsao | B28D 1/047 125/13.01 |
| 6,855,099 | B2 * | 2/2005 | Hazlehurst | B21C 51/005 29/281.5 |
| 6,874,399 | B2 * | 4/2005 | Lee | B23D 45/02 125/13.03 |
| 6,937,336 | B2 * | 8/2005 | Garcia | B23B 49/00 33/286 |
| 7,346,847 | B2 * | 3/2008 | Etter | B23B 25/06 33/286 |
| 7,567,713 | B2 * | 7/2009 | Ding | G06K 9/4604 382/141 |
| 7,755,761 | B2 * | 7/2010 | Mathis | B23B 39/04 356/399 |
| 8,040,328 | B2 * | 10/2011 | Smith | A63F 13/06 345/156 |
| 8,171,634 | B2 * | 5/2012 | Rudrapatna | F23R 3/002 29/890.1 |
| 8,937,654 | B2 * | 1/2015 | Delaney | G01B 11/00 348/94 |
| 9,623,492 | B2 * | 4/2017 | Capriotti | B23C 3/28 |
| 2002/0054795 | A1 * | 5/2002 | Chalupa | B23Q 1/5406 408/1 R |
| 2004/0262020 | A1 | 12/2004 | Arntson et al. | |
| 2005/0194195 | A1 * | 9/2005 | Francois | E01C 19/48 180/9.52 |
| 2005/0265798 | A1 * | 12/2005 | Boyl-Davis | B23Q 9/0014 408/76 |
| 2006/0159539 | A1 * | 7/2006 | Boyl-Davis | B23Q 9/0042 409/178 |
| 2008/0244888 | A1 | 10/2008 | Sarh | |
| 2008/0295822 | A1 * | 12/2008 | Gifford | B23D 47/02 125/38 |
| 2009/0112410 | A1 * | 4/2009 | Shull | B25J 9/1664 701/50 |
| 2015/0314436 | A1 * | 11/2015 | Reid | B25J 11/005 414/800 |
| 2016/0176003 | A1 * | 6/2016 | Reckev Cius | B23Q 3/1546 269/8 |

FOREIGN PATENT DOCUMENTS

| | | |
|---|---|---|
| EP | 2 835 233 | 2/2015 |
| JP | 2001 079637 | 3/2001 |

* cited by examiner

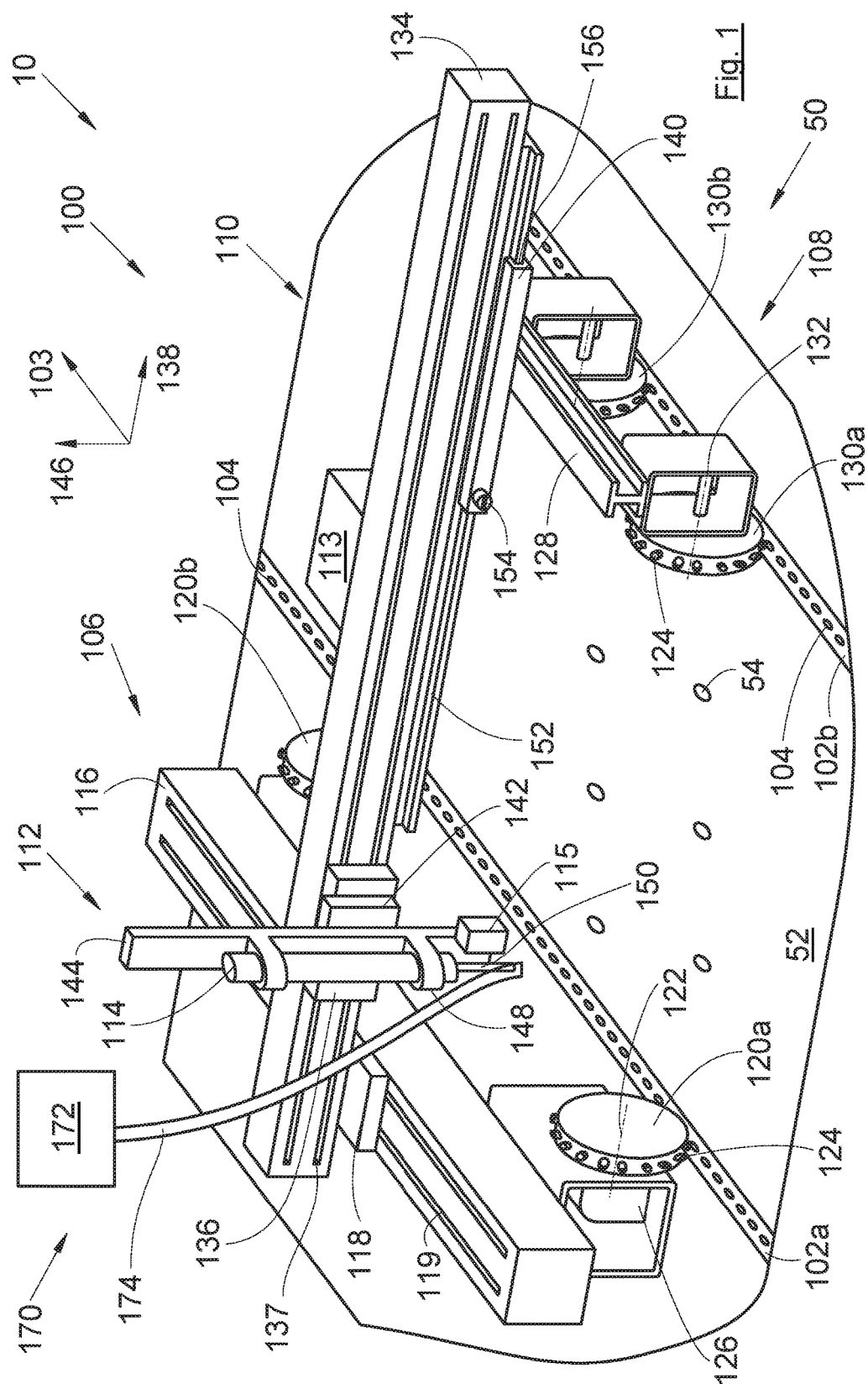

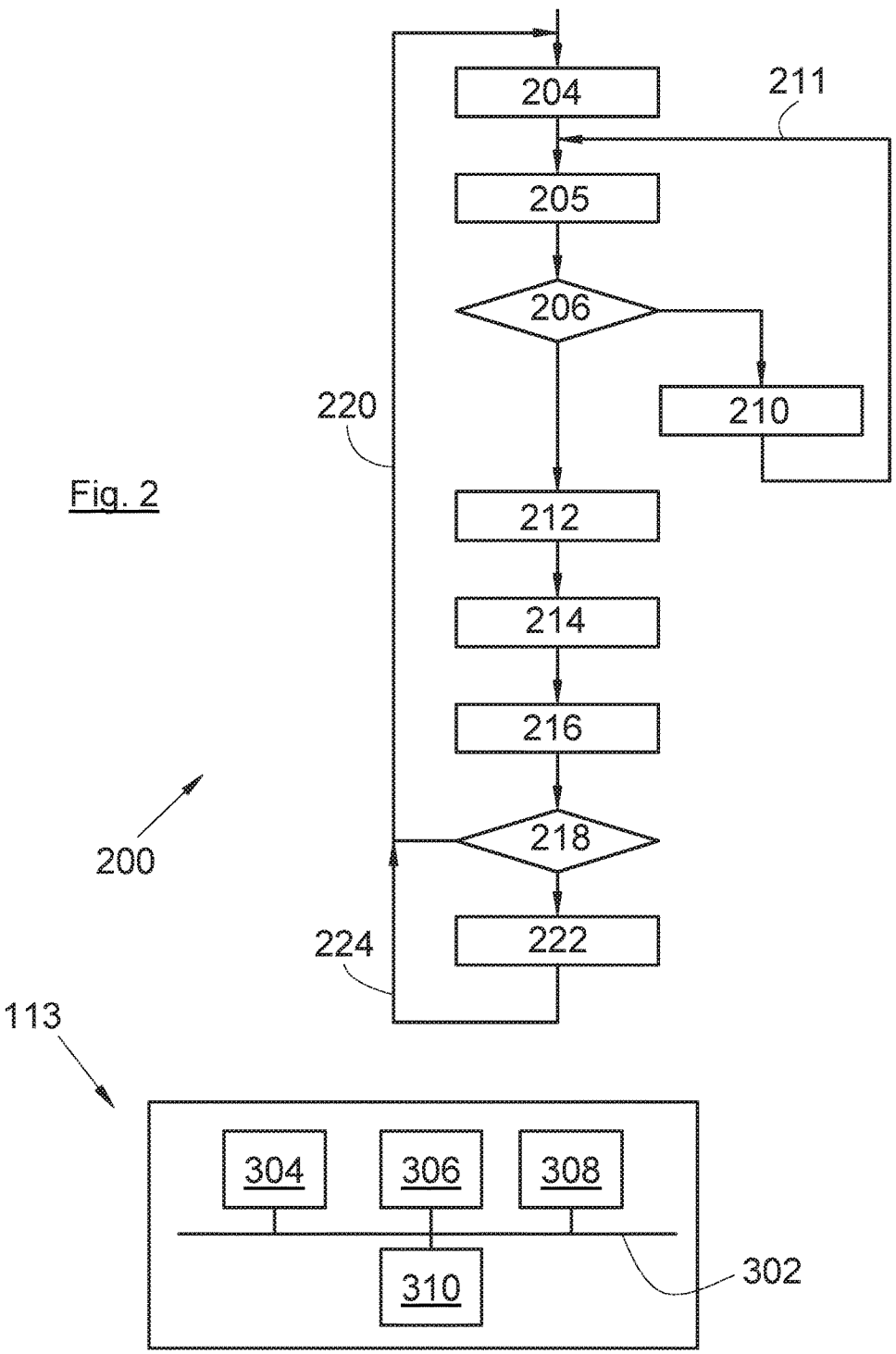

TOOL-SUPPORT SYSTEM

CROSS-REFERENCE TO RELATED APPLICATION

This application claims the benefit of and priority to French patent application number 15 57253 filed on Jul. 29, 2015, the entire disclosure of which is incorporated by reference herein.

TECHNICAL FIELD

The present disclosure concerns a tool-support system for a tool, such as a screwdriving tool, for example, to position the tool automatically relative to holes at the level of which the tool has to operate, for example, to screw in a screw, and a method of operating such a tool-support system. Such a tool-support system may in particular be used for a screwdriving tool in the context of fixing screws into a floor of an aircraft.

BACKGROUND

In the context of the construction of an aircraft including a floor, the floor has to be fixed by screws. The positions of the screws vary from one aircraft to another and there is no solution enabling automatic screwing of each of the screws. The solution employed at present consists in an operator visually identifying each hole and screwing a screw into it. Such a solution necessitates the operator to remain in a bent or kneeling position, and these are positions that are relatively uncomfortable in the long term.

SUMMARY

An object of the present disclosure is to propose a tool-support system that is free of the disadvantages of the prior art and in particular allows positioning a tool relative to holes in the floor and the activation of the tool after this positioning, for example to tighten a screw automatically in each of the holes in a floor.

To this end, there is proposed a tool-support system for working on holes of a surface, the tool-support system including:
  parallel first and second rails fixed to the surface, each of the rails having imprints regularly distributed over its length; and
  a mobile tool-support including:
    an optical system configured to capture at least one image of the surface and adapted to be moved on the mobile tool-support;
    for each rail, at least one wheel adapted to be moved on the rail; and
    a tool adapted to be moved on the mobile tool-support and carrying a working tip;
  a control unit configured to control the movement of the mobile tool-support on the rails, the movement of the tool and the movement of the optical system on the mobile tool-support;
  the tool-support system being such that, for each rail, at least one of the at least one wheels moving on the rail includes on its rolling strip counter-imprints, each having a shape complementary to that of the imprints of the rail and such that the control unit is configured:
    to analyze an image captured by the optical system and to detect the presence and a real position of a hole;
    to calculate the distance between the real position of the hole and an expected position of the hole and to compare that distance to a predefined threshold; and
    to verify if the part of the surface that can be reached by the tool has been entirely scanned by the optical system.

Such a tool-support system can therefore be moved along rails without slipping whilst detecting the holes to apply an action thereto, such as screwing in a screw. The tool-support system therefore does not necessitate the intervention of the operator, thereby facilitating their work.

Each imprint is advantageously a hole and each counter-imprint is advantageously a lug.

The tool-support advantageously includes:
  a driving carriage include a driving chassis, a longitudinal slide mounted on the driving chassis to slide parallel to a longitudinal direction of the rails, a first motorized drive system adapted to move the longitudinal slide along the driving chassis, and two driving wheels, each being motorized and mounted on the driving chassis to rotate about a rotation axis parallel to the plane of the first rail and perpendicular to the longitudinal direction, each of the two driving wheels including counter-imprints;
  a driven carriage including a driven chassis, and two driven wheels, each being mounted on the driven chassis to be freely mobile in rotation about a rotation axis parallel to the plane of the second rail and perpendicular to the longitudinal direction, each of the two driven wheels including counter-imprints;
  an assembly bar including a beam having a first end fastened to the longitudinal slide, a transverse slide mounted on the beam to slide parallel to a transverse direction parallel to the surface and perpendicular to the longitudinal direction, a second motorized drive system adapted to move the transverse slide in translation along the beam parallel to the transverse direction, and a self-locking adjustment slide mounted on the beam to slide in the transverse direction and fastened to the driven chassis;
  a support module including a shoe fastened to the transverse slide, a chassis mounted on the shoe to slide in a vertical direction and to which the tool is fixed, and a third motorized drive system adapted to move the chassis in translation relative to the shoe parallel to the vertical direction.

The optical system is advantageously fixed to the support module.

The disclosure herein also proposes a method of operating the foregoing tool-support system, including:
  a movement step during which the control unit commands the movement of the optical system above an expected position of a hole;
  a capture step during which the optical system captures an image of the area and transmits it to the control unit;
  an analysis step during which the control unit analyzes the image of the area to detect the hole and its real position;
  if the real position does not correspond to the expected position, a positioning step during which the control unit commands the movement of the tool in order to position the working tip in vertical alignment with the hole detected in this way, and a looping step during which the method loops to the capture step;
  if the real position of the hole corresponds to the expected position of the hole, a lowering step during which the control unit commands the descent of the tool to position the tip of the tool in a working position;

a working step during which the control unit commands the tool to cause it to work;

a raising step during which the control unit commands the raising of the tool;

a verification step during which the control unit verifies if the part of the surface that can be reached by the tool has been entirely scanned by the optical system;

if not, a second looping step during which the method loops to the movement step;

if yes, a repositioning step during which the control unit commands the movement of the tool-support above another part of the surface to be scanned; and a third looping step during which the method loops to the movement step.

The operating method advantageously includes between the working step and the raising step a results step during which the tool sends the control unit data relating to the work effected and the control unit stores that data.

BRIEF DESCRIPTION OF THE DRAWINGS

The features of the disclosure herein referred to above and others will become more clearly apparent on reading the following description of one embodiment, the description being given with reference to the appended drawings, in which:

FIG. 1 shows a perspective view of a tool-support system in accordance with the disclosure herein, FIG. 2 shows an algorithm of a method of operating the tool-support system in accordance with the disclosure herein, and FIG. 3 is a diagrammatic representation of a control unit.

DETAILED DESCRIPTION

In the following description, terms relating to a position are referred to a tool-support system disposed on a workpiece such as an aircraft floor, for example, i.e. as represented in FIG. 1.

FIG. 1 shows a tool-support system 10 that is positioned on a surface 52 of a workpiece 50, such as an aircraft floor, for example, that includes a plurality of holes 54. The tool-support system 10 is intended to work on the holes 54, such as by screwing a screw into each of the holes 54 if the tool is a screwdriving tool, for example, or to bore each of the holes if the tool is a drilling tool.

The tool-support system 10 includes first and second rails 102a-b, each extending in the same longitudinal direction 103, fixed to the surface 52 of the workpiece 50 and having imprints 104 regularly distributed over its length.

The tool-support system 10 also includes:
an optical system 115 configured to capture at least one image of the surface 52 and adapt it to be moved on the mobile tool-support 100;
for each rail 102a-b, at least one wheel 120a-b, 130a-b adapted to be moved on the rail 102a-b; and
a tool 114 adapted to be moved on the mobile tool-support 100 and carrying a working tip 150;
a control unit 113 configured to control the movement of the mobile tool-support 100 on the rails 102a-b and the movement of the tool 114 on the mobile tool-support 100.

Each rail 102a-b may be an element of the workpiece 50. In the case of an aircraft floor, for example, each rail 102a-b is the rail to which the seats are fixed.

In order to move the optical system 115, the tool 114, the mobile tool-support 100 includes appropriate mechanisms that make possible these movements relative to the wheels 120a-b, 130a-b.

In order to prevent the wheels 120a-b, 130a-b slipping on the rails 102a-b, for each rail 102a-b, at least one of the at least one wheels 120a-b, 130a-b moving on the rail 102a-b includes on its rolling strip counter-imprints 124, each having a shape complementary to that of the imprints 104 of the rail 102a-b.

In the embodiment of the disclosure herein shown in FIG. 1, there are four wheels 120a-b, 130a-b, namely two for each rail 102a-b, and all four are provided with counter-imprints 124.

Here the imprints 104 are holes regularly disposed one after the other. The counter-imprints 124 are lugs disposed one after the other along the rolling strip of each driving wheel 120a-b. The cooperation of the imprints 104 and the counter-imprints 124 prevents the driving wheels 120a-b from slipping on the surface 52 and ensures linear movement along the first rail 102a.

In order to control the various movements and the general operation of the tool-support system 10 that is described hereinafter, the control unit 113 is further configured:
to analyze an image captured by the optical system 115 and to detect the presence and a real position of a hole 54;
to calculate the distance between the real position of the hole 54 and an expected position of the hole and to compare that distance to a predefined threshold; and
to verify if the part of the surface 52 that can be reached by the tool 114 has been entirely scanned by the optical system.

The optical system 115 consists of or comprises a video camera, for example, the sensor of which is oriented towards the surface 52.

In the embodiment of the disclosure herein shown in FIG. 1, the tool-support 100 further includes:
a driving carriage 106;
a driven carriage 108;
an assembly bar 110; and
a support module 112.

The driving carriage 106 includes:
a driving chassis 116 that here takes the form of a bar extending in the longitudinal direction 103;
a longitudinal slide 118 mounted on the driving chassis 116 to slide parallel to the longitudinal direction 103;
a first motorized drive system arranged in the driving chassis 116 to cooperate with the longitudinal slide 118 in order to move it in translation along the driving chassis 116 parallel to the longitudinal direction 103; and
two driving wheels 120a-b, each being motorized and mounted on the driving chassis 116 to rotate about a rotation axis 122 parallel to the plane of the first rail 102a and perpendicular to the longitudinal direction 103 of the first rail 102a, each driving wheel 120a-b including counter-imprints 124 on its rolling strip.

Each driving wheel 120a-b is driven in rotation by a motor 126 fixed to the driving chassis 116. Installing two motors 126 allows using lighter motors which avoids having to provide structural reinforcement of the driving chassis 116.

The first motorized drive system is for example a system including a lead screw the axis of which is parallel to the longitudinal direction 103 and a motor adapted to drive the lead screw in rotation. The lead screw then meshes with a nut of the longitudinal slide 118 to move it in translation one way or the other according to the direction of rotation of the lead screw. Here the movement in translation of the longitudinal slide 118 is guided by two parallel grooves 119 provided in the driving chassis 116 for this purpose.

In order to command the rotation of the driving wheels 120a-b and the movement of the longitudinal slide 118, the control unit 113 is configured to command the motors 126 and the first motorized drive system.

The driven carriage 108 includes:
a driven chassis 128 that here takes the form of a bar extending in the longitudinal direction 103; and
two driven wheels 130a-b, each being mounted on the driven chassis 128 to rotate freely about a rotation axis 132 parallel to the plane of the second rail 102b and perpendicular to the longitudinal direction 103 of the second rail 102b. Each driven wheel 130a-b has counter-imprints 124 on its rolling strip.

The assembly bar 110 includes:
a beam 134 having a first end and a second end, the first end being fastened to the longitudinal slide 118;
a transverse slide 136 mounted on the beam 134 to slide parallel to a transverse direction 138 parallel to the plane of the rails 102a-b and perpendicular to the longitudinal direction 103 of the rails 102a-b;
a second motorized drive system arranged in the beam 134 to cooperate with the transverse slide 136 in order to move it in translation along the beam 134 parallel to the transverse direction 138; and
a self-locking adjustment slide 140 mounted on the beam 134 to slide in the transverse direction 138 and fastened to the driven chassis 128.

The adjustment slide 140 is moved between the first end and the second end.

The second motorized drive system is for example a system including a lead screw the axis of which is parallel to the transverse direction 138 and a motor adapted to drive the lead screw in rotation. The lead screw then meshes with a nut of the transverse slide 136 to move it in translation one way or the other depending on the direction of rotation of the lead screw. Here the movement of the transverse slide 136 in translation is guided by two parallel grooves 137 that the beam 134 includes for this purpose.

In order to command the movement of the transverse slide 136, the control unit 113 is configured to command the second motorized drive system.

The sliding connection that provides the movement in translation of the adjustment slide 140 is provided by a linear guide system. In the embodiment of the disclosure herein shown in FIG. 1, the linear guide system consists of or comprises a T-section rail 152 fixed under the beam 134 and a groove 154 in the adjustment slide 140 that enables it to be fitted over the T-section rail 152.

The linear guide system also includes a manual brake 154 on the adjustment slide 140 that must be maneuvered by the operator to release the adjustment slide 140 and allow it to move freely in translation along the T-section rail 152. In the embodiment of the disclosure herein described here the manual brake 154 takes the form of a grubscrew that is clamped against the beam 134.

Other embodiments for the manual brake 154 may be envisioned.

For example, the manual brake may consist of or comprise a set of detents along the beam 134 and a spring-mounted stud mobile between an engaged position in which the stud is interengaged with a detent to immobilize the adjustment slide 140 and a released position in which the stud is at a distance from the detent and releases the adjustment slide 140, the spring urging the stud into the interengaged position.

In accordance with another example, the manual brake may be a handle that can be screwed in and out and a portion of which comes to bear against the T-section rail 152.

The support module 112 includes:
a shoe 142 fastened to the transverse slide 136;
a chassis 144 mounted on the shoe 142 to slide in a vertical direction 146 perpendicular to the plane of the rails 102a-b and to which the tool 114 is fixed; and
a third motorized drive system arranged in the shoe 142 to cooperate with the chassis 144 in order to move it in translation relative to the shoe 142 parallel to the vertical direction 146.

The screwdriving tool 114 is fixed to the chassis 144 by any appropriate type of fixing structure 148 such as a clamping system, for example.

The third motorized drive system is for example a system including a lead screw the axis of which is parallel to the vertical direction 146 and a motor adapted to drive the lead screw in rotation. The lead screw then meshes with a nut of the chassis 144 to move it in translation one way or the other depending on the direction of rotation of the lead screw.

In order to command the movement of the chassis 144, the control unit 113 is configured to command the third motorized drive system.

The tool 114 has a working tip 150, such as a screwdriving tip or a drill bit, for example.

The optical system 115 is fixed to the support module 112 and more particularly to the chassis 144.

FIG. 3 is a diagrammatic representation of the control unit 113 which conventionally includes, connected by a communication bus 302: a processor or central processing unit (CPU) 304, a random access memory (RAM) 306, a read-only memory (ROM) 308, a storage unit and at least one communication interface 310 enabling the tool 114, the motors 126 of the drive wheels 120a-b and the motors of the drive systems to communicate with the optical system 115.

The processor is able to execute instructions loaded into the RAM 306 from the ROM 308. When the equipment is switched on, the processor 304 is able to read instructions from the RAM 306 and execute them. These instructions form a computer program causing the execution by the processor 304 of some or all of the algorithms and steps described below.

FIG. 2 shows an algorithm 200 of a method of operating the tool-support system 10.

Placing the tool-support system 10 over a portion of the surface 52 entails placing the driving wheels 120a-b on the first rail 102a and the driven wheels 130a-b on the second rail 102b so that the counter-imprints 124 are interengaged with the imprints 104 and initializing the position of the optical system 115 to a position serving as a geometric reference. The control unit 113, and more particularly the RAM 306, is loaded with a computer-assisted design (CAD) file in which are stored the expected coordinates of the holes 54 relative to the geometrical reference.

The operating method then includes:
a movement step 204 during which the control unit 113 commands the movement of the optical system 115 above an expected position of a hole 54, in particular by moving the longitudinal slide 118 and/or the transverse slide 136 by the appropriate drive system;
a capture step 205 during which the optical system 115 captures an image of the area and transmits it to the control unit 113;

an analysis step 206 during which the control unit 113 analyzes the image of the area to detect the hole 54 and its real position;

if the real position does not correspond to the expected position, a positioning step 210 during which the control unit 113 commands the movement of the tool 114 in order to position the working tip 150 in vertical alignment with the hole 54 detected in this way, in particular by moving the longitudinal slide 118 and/or the transverse slide 136 by the drive system, and a looping step 211 during which the method loops to the capture step 205;

if the real position does correspond to the expected position, a lowering step 212 during which the control unit 113 commands the descent of the tool 114, in particular by lowering the chassis 144 by the third drive system, to position the working tip 150 in a working position;

a working step 214 during which the control unit 113 commands the tool 114 to cause it to work;

a raising step 216 during which the control unit 113 commands the raising of the tool 114, in particular by raising the chassis 144 by the third drive system;

a verification step 218 during which the control unit 113 verifies if the part of the surface 52 that can be reached by the tool 114, in particular the part between the driving carriage 106 and the driven carriage 108, has been entirely scanned by the optical system 115;

if not, a second looping step 220 during which the method loops to the movement step 204;

if yes, a repositioning step 222 during which the control unit 113 commands the movement of the tool-support 100, in particular by rotation of the driving wheels 120a-b in order to move the tool-support 100 above another part of the surface 52 to be scanned; and a third looping step 224 during which the method loops to the movement step 204.

A method of this kind and a tool-support system of this kind enable automatic detection of the holes 54 and the execution of work at the level of each hole 54 whilst scanning all the surface 52, thereby facilitating the work of the operator.

The analysis step 206 consists in or comprises analyzing the captured image in order to deduce from it the real position of the hole 54. This analysis is effected on the basis of an appropriate image processing system such as the KEYENCE CV-X100 system, for example, which looks for the existence of the hole 54 in the image by shape recognition and allows calculating the coordinates of each hole 54 it sees.

The positioning step 210 consists in or comprises placing the working tip 150 correctly by a sequence of successive loops, for example placing the screwdriving tip or the bit relative to the hole 54. This positioning relies in particular on the dimensional characteristics of the tool-support system 10. In fact, the position of the optical system 115 relative to the working tip 150 is known by construction and the position of the hole 54 relative to the optical system 115 is known from the analysis step 206. The control unit 113 is then able to deduce from this the position of the hole 54 relative to the working tip 150 and to move the longitudinal slide 118 and/or the transverse slide 136 and/or the driving wheels 120a-b in order to position the working tip 150 in vertical alignment with the hole 54. More particularly, if the distance between the real position of the hole 54 and the expected position of the hole 54 is below a predefined threshold, the positioning step 210 is not carried out. The predefined threshold is linked among other things to the geometrical tolerances and to the functional clearances of the various moving parts.

When all the area of the surface 52 between the driving carriage 106 and the driven carriage 108 has been scanned by the optical system 115, the verification step 218 allows moving the tool-support 100 during the repositioning step 222 to place it over a new area to be scanned.

In the embodiment of the disclosure herein shown in FIG. 1, the control unit 113 is adapted to command the first drive system in order to move the longitudinal slide 118, the second drive system is adapted to move the transverse slide 136, the appropriate motor is adapted to move the drive wheels 120a-b, and the third drive system is adapted to lower and raise the chassis 144 and the tool 114.

When the tool 114 is a screwdriving tool, the tool-support system 10 also includes a feeder unit 170. The feeder unit 170 includes a bin 172 for storing the screws, for example of the vibrating bowl type, a transfer tube 174 connected to the bin 172, for example, pneumatically, and adapted to allow a screw from the bin 172 to have its head placed under the screwdriving tip 150. The feeder unit 170 may be fixed to one of the carriages 106, 108 or to the assembly bar 110, or be fixedly disposed alongside. A feeder unit 170 of this kind is known to the person skilled in the art and allows, as soon as a screw is screwed in and extracted from the transfer tube 174, feeding a new screw under the screwdriving tip 150. A feeder unit 170 of this kind is for example an FIAM "Autofeed Tightening Module" system.

The lowering step 212 then consists more particularly in or comprises feeding the threaded shank of the screw, present under the screwdriving tip 150, into the hole 54, and placing the screwdriving tip 150 against the head of the screw.

The working step 214 then consists more particularly in or comprises causing the screwdriving tip 150 to turn in the direction for screwing in the screw, at the same time as commanding lowering of the chassis 144 to follow the screw as it is driven into the hole 54.

Generally speaking, the operating method 200 may include between the working step 214 and the raising step 216 a results step during which the tool 114 sends the control unit 113 data relating to the work done and the control unit 113 stores that data in its random-access memory 306.

All of this data can then be consulted by the operator, who is therefore able to verify if the work of the tool has been executed perfectly at each hole 54.

This data for example consists of or comprises data relating to the fact that the work has been done well or has been done badly and there has been a problem.

When the tool 114 is a screwdriving tool, the data relating to the work done comprise or consist for example, for the screwdriving tool, of counting the number of turns by which to turn the screw has to be turned to reach a predefined tightening torque. Accordingly, if the number of turns is insufficient relative to a predefined range, this means for example that the screw has become locked before reaching the expected final position, and if the number of turns is too high relative to the predefined range, that means that the screw has turned without advancing and may have been damaged.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool-support system for working on holes of a surface of a workpiece, the tool-support system comprising:
    parallel first and second rails fixed to the surface of the workpiece, each of the first and second rails having imprints regularly distributed over lengths thereof, respectively,
    a mobile tool-support including:
        an optical system configured to capture at least one image of the surface of the workpiece, wherein the optical system is movable on the mobile tool-support,
        for each rail, at least one wheel that is movable on the rail, and
        a tool that is movable on the mobile tool-support and comprises a working tip, and
    a control unit configured to control movement of the mobile tool-support on the rails, movement of the tool on the mobile tool-support, and movement of the optical system on the mobile tool-support;
    wherein at least one of the at least one wheel has counter-imprints on a rolling strip thereof, each of the counter-imprints having a shape complementary to that of the imprints of the rails, and
    wherein the control unit is configured to:
        analyze an image captured by the optical system and to detect both a presence of a first hole in the surface of the workpiece and a real position of the first hole in the surface of the workpiece;
        calculate a distance between the real position of the first hole and an expected position of the first hole,
        compare the distance to a predefined threshold; and
        verify if a part of the surface of the workpiece that can be reached by the tool has been entirely scanned by the optical system.

2. The tool-support system of claim 1, wherein each of the imprints is a perforation and each of the counter-imprints is a lug.

3. The tool-support system of claim 1, comprising:
    a driving carriage including:
        a driving chassis,
        a longitudinal slide mounted on the driving chassis to slide parallel to a longitudinal direction of the rails,
        a first motorized drive system configured to move the longitudinal slide along the driving chassis, and
        two driving wheels that are each motorized and mounted on the driving chassis to rotate about a rotation axis, parallel to a plane of the first rail and perpendicular to the longitudinal direction, wherein each of the two driving wheels comprise counter-imprints,
    a driven carriage including:
        a driven chassis, and
        two driven wheels, wherein each of the two driven wheels are mounted on the driven chassis to be freely mobile in rotation about a rotation axis, parallel to a plane of the second rail and perpendicular to the longitudinal direction, and wherein each of the two driven wheels comprise counter-imprints,
    an assembly bar including:
        a beam with a first end that is fastened to the longitudinal slide,
        a transverse slide that is mounted on the beam to slide parallel to a transverse direction, parallel to the surface of the workpiece and perpendicular to the longitudinal direction,
        a second motorized drive system configured to move the transverse slide in translation along the beam, parallel to the transverse direction, and
        a self-locking adjustment slide, which is mounted on the beam to slide in the transverse direction and is fastened to the driven chassis, and
    a support module including:
        a shoe fastened to the transverse slide,
        a chassis mounted on the shoe to slide in a vertical direction, wherein the tool is fixed to the chassis, and
        a third motorized drive system configured to move the chassis in translation relative to the shoe, parallel to the vertical direction.

4. The tool-support system of claim 3, wherein the optical system is fixed to the support module.

5. A method of operating a tool-support system for working on holes of a surface of a workpiece, the tool-support system comprising:
    parallel first and second rails fixed to the surface of the workpiece, each of the first and second rails having imprints regularly distributed over lengths thereof, respectively,
    a mobile tool-support including:
        an optical system that is movable on the mobile tool-support,
        for each rail, at least one wheel that is movable on the rail, and
        a tool that is movable on the mobile tool-support and comprises a working tip, and
    a control unit configured to control movement of the mobile tool-support on the rails, movement of the tool on the mobile tool-support, and movement of the optical system on the mobile tool-support;
    wherein at least one of the at least one wheels has counter-imprints on a rolling strip thereof, each of the counter-imprints having a shape complementary to that of the imprints of the rails, and the method comprising:
- a movement step, comprising moving, using the control unit, the optical system above an area, including an expected position of a first hole formed in the surface of the workpiece;
- a capture step, comprising capturing, using the optical system, an image of the area and transmitting the image to the control unit;
- an analysis step, comprising analyzing, using the control unit, the image of the area to detect the first hole and a real position of the first hole;
- if the real position does not correspond to the expected position, a positioning step, comprising moving, using the control unit, the tool to position the working tip in vertical alignment with the first hole, and a looping step, during which the method loops to the capture step;
- if the real position of the first hole corresponds to the expected position of the first hole, a lowering step, comprising descending, using the control unit, the tool to position the working tip of the tool in a working position;
- a working step, comprising working the tool using the control unit;
- a raising step, comprising raising the tool,
- a verification step, comprising verifying, using the control unit, if a part of the surface of the workpiece that can be reached by the tool has been entirely scanned by the optical system;
- if not, a second looping step, during which the method loops to the movement step;
- if yes, a repositioning step comprising moving, using the control unit, the tool-support above another part of the surface of the workpiece to be scanned; and
- a third looping step, during which the method loops to the movement step.

6. The method of claim 5, the method comprising, between the working step and the raising step, a results step, comprising sending data relating to work effected from the tool to the control unit, and storing the data in the control unit.

* * * * *